United States Patent
Fetsch et al.

[11] Patent Number: 5,979,214
[45] Date of Patent: Nov. 9, 1999

[54] BENDING MACHINE FOR SHEET-LIKE WORKPIECES, PARTICULARLY FOR CREATING BENT EDGES ON SHEET METAL PIECES

[75] Inventors: Heinz Fetsch, Ettenheim; Hermann Kaltenbach, Gundelfingen; Walter Pfleiderer, Teningen, all of Germany

[73] Assignee: EHT Werkzeugmaschinen GmbH, Teningen, Germany

[21] Appl. No.: 09/200,211

[22] Filed: Nov. 25, 1998

Related U.S. Application Data

[63] Continuation of application No. PCT/EP97/02609, May 22, 1997.

[30] Foreign Application Priority Data

May 30, 1996 [DE] Germany .......................... 196 21 658

[51] Int. Cl.[6] .................................................. B21D 43/10
[52] U.S. Cl. .................................. 72/422; 72/420; 72/311
[58] Field of Search ............................ 72/306, 308, 323, 72/311, 419–422, 298, 300, 309, 312, 316, 319; 901/30, 31, 39; 483/31, 901; 294/103.1, 104, 106; 414/739–741, 751

[56] References Cited

U.S. PATENT DOCUMENTS

| | | |
|---|---|---|
| 4,005,782 | 2/1977 | Crockett . |
| 4,510,785 | 4/1985 | Triouleyre et al. . |
| 4,557,135 | 12/1985 | Ragettli et al. . |
| 4,573,861 | 3/1986 | Aschauer . |
| 4,976,484 | 12/1990 | Nomaru et al. ....................... 294/119.1 |
| 5,138,865 | 8/1992 | Codatto ...................................... 72/422 |
| 5,180,049 | 1/1993 | Salvagnini ............................. 198/699.1 |
| 5,187,958 | 2/1993 | Prunotto et al. . |
| 5,501,498 | 3/1996 | Ulrich ...................................... 294/106 |
| 5,713,233 | 2/1998 | McCarthy et al. ......................... 72/311 |
| 5,761,951 | 6/1998 | Codatto ...................................... 72/422 |
| 5,802,906 | 9/1998 | Lillbacka et al. .......................... 72/323 |

FOREIGN PATENT DOCUMENTS

| | | |
|---|---|---|
| O 115 602 A1 | 12/1983 | European Pat. Off. . |
| 28 39 978 C2 | 3/1979 | Germany . |
| 39 08 496 A1 | 9/1989 | Germany . |
| WO 95/11767 | 5/1995 | WIPO . |

OTHER PUBLICATIONS

International Search Report from German Application No. PCT/EP97/02609 dated Sep. 22, 1997.

*Primary Examiner*—Joseph J. Hail, III
*Attorney, Agent, or Firm*—Akin, Gump, Strauss, Hauer & Feld, L.L.P.

[57] ABSTRACT

A bending machine (1) for bending the edges (3) on sheet-like workpieces (2). The workpieces (2) can be grasped by clamping jaws (12) located on a manipulator (11) and supplied to a tool (6) and a mount. The manipulator (11) is located and supported above the processing plane and the workpiece support (4). The clamping jaws (12) can, in addition to being movable transversely or perpendicular to the tool (6), are also movable parallel thereto, and can rotate about an axis (15) running perpendicular to the workpiece plane. The workpieces (2) can be held in any position and then conveyed, without the need for additional conveying, transfer and removal devices, because all of these functions can also be performed by the manipulator (11).

19 Claims, 13 Drawing Sheets

BENDING MACHINE FOR SHEET-LIKE WORKPIECES, PARTICULARLY FOR CREATING BENT EDGES ON SHEET METAL PIECES

This application is a continuation of application No. PCT/EP97/02609, filed May 22, 1997.

BACKGROUND OF THE INVENTION

The invention involves a bending machine for sheet-like workpieces, for creating bent edges, having a horizontal workpiece support and having a bending tool that has a bending beam as well as having a hold-down clamp for the workpiece arranged near the bending tool, where the bending machine has at least one manipulator with clamping jaws for holding the workpiece, the clamping jaws have a lower grip and an opposing upper grip that can be moved vertically in the usage position, and the clamping jaws can be moved approximately in the plane of the workpiece or in a parallel plane, transversely or at a right angle to the hold-down clamp of the tool, or can be moved transversely or at a right angle to the tool, and also makes possible a rotation of the workpiece around a vertical axis.

A known bending machine is disclosed in German patent DE 28 39 978 B2. It functions for the purpose of providing a bent edge having a generally right-angled shape on sheet metal pieces. The clamping jaws are moved horizontally below the workpiece support and the workpiece on a carriage transversely or at a right angle to the bending line, i.e. to the workpiece edge to be processed, or transversely or at a right angle to the workpiece. It can thus convey a sheet metal plate, previously held by the clamping jaws, as a workpiece to the bending tool and based on the rotating ability, cause a change in the position of the workpiece in its working plane. In this process, the upper grip can be lifted so that the clamping jaws can be moved away from the bent edge after a bending operation, such that the previously processed workpiece is released. It must then be removed from the clamping jaws or from the bending machine by an additional removal device. In the same manner, feeding into the clamping jaws must also be done with this device itself or with another device or by hand.

By this construction, a limited possibility for feeding and conveying results, and furthermore, the removal of a completed, processed workpiece must also take into account the presence of the clamping jaws and their carriage, i.e. the removal is restricted by the manipulator and its bed below the workpiece support. Furthermore, by this known construction, it is necessary for efficient processing that a workpiece is grasped in its center because otherwise when changing from one processing edge to the next one, i.e. when turning the workpiece, under some circumstances, an opening of the clamping jaws and a relative shift between the clamping members and workpiece is necessary in order to be able to take into account different dimensions of the workpiece in different directions. Based on this, the bending workpiece must also be arranged symmetrically to the movement axis of the clamping jaws.

From U.S. Pat. No. 5,187,558, a shaping machine of another type is known, namely a bending press. In addition, a bending machine or a shearing machine is mentioned in it, but not described in greater detail. In the bending press, a hold-down clamp is not provided, since the sheet metal edges are bent upwards opposite the forging die during the forming process, and thus move upwards relative to the tool. A manipulator functioning for the feeding and positioning the workpiece can also be used in this previously known solution, conducted underneath the workpiece plane and must release the workpiece when the workpiece is formed and it is not designed to follow the formation movements of the workpiece.

BRIEF SUMMARY OF THE INVENTION

It is therefore the object of the invention to create a bending machine of the above-noted type, in which a workpiece can be held at any desired position, i.e. even outside of its center, and then fed to the tool such that additional feeding, conveying, and removal devices are no longer necessary and the processing within the bending machine can take place at different positions of the tool, especially if the tool(s) is/are divided.

To achieve this purpose, the present bending machine is characterized in that the manipulator is arranged and supported above the processing plane of the workpiece, and that the clamping jaws can also be moved, in addition to its capacity for movement transversely or at right-angles to the hold-down clamp, parallel to the hold-down clamp and is supported so that it can be rotated around an axis extending at a right angle to the workpiece plane.

The manipulator is thus arranged above the workpiece plane and the workpiece support, so that it does not restrict or impede the feed and the removal of the workpiece. In this way, the clamping jaws of the manipulator arranged above the bending machine have, in an advantageous way, additional movement possibilities so that it itself can be pulled forward so as to remove a workpiece from a supply stack and feed it to the bending machine, and in this process also to bring it into a desired exact location or position. In addition, the clamping jaws can move the workpiece into a new processing position after a first processing by its rotational movement, which under certain circumstances can be coupled with a displacement movement occurring parallel to the bending tool, without additional helping mechanisms having to be used and without the clamping jaws having to hold the exact center of the workpiece. Then, the workpiece can again be removed from the bending machine by the clamping jaws after processing and put down. By the arrangement above the workpiece support, i.e. the suspension of the manipulator and the clamping jaws from above, a resulting advantage is that workpieces of almost any desired size can be grasped, fed and processed, as well as removed, and that these workpieces can be fed and processed at different positions within the bending machine in the area of tools correspondingly arranged there, i.e. the feeding is no longer rigidly dependent on a carriage guide directed towards the center of the machine.

An additional advantage of the arrangement according to the invention is that in the entire movement area of the clamping jaws, through the use of additional take-off positions for corresponding workpieces, the placement of the prepared, processed workpieces can occur at several positions, so that because of the design according to the invention and the arrangement of the manipulator, a distribution of the workpieces depending on the requirement, for example, for subsequent processing, can occur. Therefore, in an advantageous way of using the clamping jaws, the workpieces can even be moved out of a processing machine designed as a bending machine, in which an edge, especially the last processed edge is bent downwards relative to the horizontal orientation of the workpiece, because with the help of the possible movement of the manipulator or the clamping jaws parallel to the bending edge, a workpiece of this type can also be moved sideways out from the bending machine to one side, provided that the edges arranged transversely to this movement are bent upwardly or not at all.

One arrangement of the invention of considerable importance, which makes possible a lifting out of the workpieces with surrounding edges bent downwardly, provides that the clamping jaws on the manipulator and/or the upper grip of the clamping jaws and/or the entire manipulator can be adjusted or moved upwardly in a direction perpendicular to the processing plane. This has the additional advantage that workpieces can even be processed which are not flat in their middle area, but instead are provided with bumps or depressions, so that the clamping jaws attaching there must assume a height position during processing different than if it were to grasp a smooth and flat workpiece. Moreover, workpieces with relatively large inner openings can be grasped from inside the opening and positioned.

Because of the different movement possibilities of the manipulator described, the bending machine can have one or more take-up positions for sheet-like workpieces which are arranged within the movement area of the manipulator and/or the clamping jaws and contain the respective workpieces, preferably in already oriented positions. Since the manipulator can be moved in several directions, it can cover a relatively large area, so that in an advantageous way several take-up positions for sheet-like workpieces can be accommodated in this area, in order to, for example, be able to prepare different sized workpieces or a larger number of workpieces than would be possible with only one take-up position. The workpieces can be grasped from these take-up positions directly with the clamping jaws of the manipulator and fed into the bending machine for their processing, because they can already be pre-positioned in their take-up position.

A preferred arrangement of the invention makes it possible to release, in a simple way, a workpiece or sheet metal piece that is bent at its edges from the clamping jaws, or using the clamping jaws to grasp a partially bent sheet metal part on its edges, where the clamping jaws must be able to extend over an already bent edge area. This can be achieved in this embodiment of the invention in that the upper grip of the clamping jaws, opposed to the lower grip, has an open area for the surrounding of even a profiled edge of the workpiece when the clamping jaws are closed, and that the lower grip, in order to access this open area, can be moved out of the way relative to the closed position, from the area of the upper grip and of the open area. In this process, between the upper grip and the lower grip, a large space can be provided as the lower access opening to the open area, such that the clamping jaws can be lifted upwardly relative to an outwardly bent edge, in order to release the workpiece. In an opposite manner, it can thus be placed over or onto the workpiece from above over a bent edge and grasp the workpiece in spite of a bent edge, which can, for example, during a multiple bending and moving of a workpiece, be very useful in the processing machine or bending machine.

The lower grip can be pivoted opposite the upper grip in the horizontal direction around a vertical axis, to the side of the open area, in order to release the workpiece and access the open area, or moved as a whole, generally parallel to the workpiece. Especially advantageous is the horizontal moving ability of the lower grip opposite the upper grip, such that between the lower grip and the upper grip, the aforementioned space is created. In spite of this, however, within the guide required for this movement, a good transfer of the clamping force is made possible when the upper and lower grips clamp against each other. Furthermore, in this manner, no space is required for a pivoting movement. Moreover, on the manipulator there is enough space to guide and move the lower grip and a part connected to it bordering the open area.

The upper grip can be moved vertically opposite the lower grip to create a clamping force, in particular opposite to the lower grip that can be moved in the horizontal direction for opening. Thus, the lower grip can then be brought into its holding position, in which a workpiece is located between it and the upper grip, where the upper grip can then be moved slightly downwardly for the actual clamping movement.

In order to also grasp, hold and move relatively large workpieces with a sufficient amount of safety and precision, it is advantageous if the clamping jaws have at least two clamping positions set apart at a distance. In this way, clamping forces can be applied at two spaced apart positions, such that an improvement of the handling of the workpieces can also be achieved during rotation.

It is especially advantageous if the upper grip of the manipulator includes at least two clamping dies which can be moved in the vertical direction for clamping and releasing or a clamping rocker having two clamping positions which is connected to a clamping cylinder. In this way, intentionally defined clamping forces can be applied at both spaced apart clamping positions, which can not be achieved with a sufficient degree of safety using only one clamping die, which possibly has its effective area enlarged, for example, for unevenness or imperfections of the workpiece. Using a clamping rocker, the clamping forces applied by a clamping cylinder can be distributed well and uniformly at both clamping positions.

The lower grip can have a undivided support surface, which in the area of the clamping die(s) of the upper grip have a respective raised or heightened opposing surface for the clamping die. Thus, spaced apart clamping positions also result for an undivided lower grip, together with the clamping dies, on a single clamping jaw.

In order to make clamping jaws with the desired open area between the lower grip and the upper grip, and in spite of the movability of the lower grip relative to the upper grip in the usage position, be able to transfer sufficiently high clamping forces, possibly originating from several clamping dies, it is advantageous if the lower grip which can be moved opposite the upper grip in the horizontal direction with its moving guide together as a whole, has a C or a U shaped profile. The inside of the C or the lying U preferably forms at least one part of the open area of the clamping jaws and the lower in the usage position somewhat horizontal leg forms the actual lower grip. The upper leg forms the guide piece of the lower grip, and the rigid connection of the lower grip to its suspension or moving support. A lower grip constructed in this manner, roughly similar to a C or a lying U, can be constructed to be sufficiently rigid in order to transfer the clamping forces well so that simultaneously the upper horizontal leg makes possible a good guidance for the horizontal displacement movement in the usage position, has a double function in which it allows the desired movability and a good introduction of force into the guide and thus into the manipulator. The "C" or "U" forming the lower grip and essentially surrounding the open area is closed in the usage position at its opening by the upper grip.

The lower grip can be runner shaped and rounded off or chamfered on its lower side opposing the movement direction that it runs through during its movement. Preferably, the support for the workpiece is covered with bristles in order to prevent damage to the underside of the workpiece when it is displaced or moved. During a displacement of the lower grip, it can be moved especially easily opposite the bristles, if it has the aforementioned runner-shaped rounding or chamfering.

A further embodiment of the bending machine with manipulator according to the invention includes protection during collisions with possibly deformed workpieces to prevent overloading of the movement guides and drives of the manipulator, in that the lower grip and/or the upper grip of the clamping jaws and/or its suspension have or are formed to include at least one break-off position. If, for example, the open area located on the clamping jaws is completely filled with a sheet metal piece and/or its bent edge and this workpiece (constructed as a sheet metal piece) collides with the machine frame during a movement because of a non-planned deformation, this collision is transferred to the clamping jaws and thus to the manipulator. In order to prevent such a collision from causing residual deformations or damage in the guides and drives, an easily replaceable part of the clamping jaws is broken off in such a case, by the aforementioned break-off position, and accordingly, the expensive guide of the manipulator or the corresponding drive is protected. The break-off position or the break-off positions are thus arranged between an easily replaced part of the clamping jaws and the remaining parts or the manipulator.

It is preferred if the break-off position is formed by a correspondingly weak or weakened mounting bolt for attaching the lower grip to the sliding guide or to the guide piece of the lower grip. In the collision case described, this bolt, which is especially easy to replace, will break.

The upper grip can be attached to its mount with one or more bolts measured to be weak or provided with break-off positions. Thus, at this position, the corresponding protection against excess loading is provided, which in case of an overloading, only easily replaced bolts break.

The suspension and supports for the manipulator, arranged above the workpiece and processing plane, can be directly or indirectly connected to the machine frame of the bending machine or have their own stand, which in the area of the assembly surface, is located at a define set off position to the machine frame and is preferably fixed there. Thus, the under certain circumstances computer-controlled movements of the manipulator with a workpiece always result in precise and predetermined positioning within the bending machine so that prepositioned workpieces can be grasped and further processed with the necessary precision in the bending machine, without an additional positioning having to be carried out on or in the bending machine itself.

The machine frame and the mount stands for the manipulator may each have fixed standing locations independent of each other, on a common foundation or two foundations which are set off at a predetermined distance, or the like. Most of all, a mount stand for the manipulator, installed at a predetermined set off distance next to the machine frame, allows for retrofitting an already installed bending machine with the manipulator according to the invention in a relatively simple way, because the manipulator can be installed with its mount stands at a defined distance from such a bending machine.

For the overlapping movement possibilities according to the invention for the manipulator, it is preferred that an additional guide girder is arranged horizontally, at a right-angle to a horizontal guide support on the bending machine or the machine frame, with the horizontal guide support running parallel to a processing side of a workpiece, and the additional guide girder is connected via a carriage to the guide support, and for its part carries a horizontally movable adjustment carriage on which a vertically movable mounting carriage is arranged. The clamping jaws are rotatably supported on the vertically movable mounting carriage. On the horizontal guide support, the carriage can thus be moved, with the guide girder held by it, approximately parallel to a processing side or parallel to a bending line of a bending machine On the guide girder arranged at a right-angle to it, the adjustment carriage can then likewise be moved in the horizontal direction, but at a right angle to the movement of the carriage, such that the possibility results for moving the vertically adjustable mounting carriage with the rotatably mounted clamping jaws over a surface area which is determined by the lengths of the guide support and the guide girder.

Moreover, further embodiments include arranging path transmitters on the carriage and/or the sliding guides, and a rotational position transmitter on the rotational support of the clamping jaws. These transmitters are connected to the controller for the bending machine. In this way, an automatic and repeated, and in particular, a programmable movement of the manipulator and the clamping jaws is possible, so that in almost any desired sequence, different workpieces can be precisely grasped, fed in and processed. Furthermore, a preliminary sorting of the processed workpieces can be performed in this way. For the adjustment of the two horizontally adjustable carriages, play free, electric direct linear drives can be provided. Correspondingly exact movements of the clamping jaws can be provided in this manner.

An additional embodiment of the invention, having considerable significance, includes providing the bending machine with at least one additional manipulator with clamping jaws, with the manipulator preferably being arranged on the same horizontal guide support. The horizontal guide support then requires only one additional carriage having a support girder, on which an adjustment carriage can be moved, upon which the vertically adjustable mounting carriage with the rotatably mounted clamping jaws is supported. By such an arrangement with, for example, two manipulators, two smaller workpieces can, for example, be simultaneously processed in a correspondingly dimensioned bending machine. The other possibility includes using the one manipulator to feed in a workpiece, and using the second manipulator to transport a previously finished workpiece away. In this way, considerable efficiency possibilities result because the manipulators can be provided from above the working plane and is not arranged below the working plane in an interrupting manner.

It is especially advantageous if the aforementioned characteristics and measures can be made separately or especially in functional combinations on a processing machine constructed as a bending machine for sheet metal. Such sheet metal is frequently provided on all four edges with bends and profiles so that the manipulator according to the invention, that can be moved with multiple degrees of freedom, grasps such sheet metal workpiece from a pre-positioned location, feeds it to the bending machine and then can also convey it into the different processing positions within the bending machine. Since the manipulator can also perform a rotational movement, along with multiple horizontal sliding movements, it does not need to grasp in the center of the workpiece, and can grasp any size workpiece so that only the size of the machine limits the size of the workpieces. If, for example, a piece of sheet metal is grasped relatively near to an edge by the manipulator and its clamping jaws, a rotation of by 90°, for example, can be made after a first bending of first edge. Since the clamping jaws do not grasp in the center, but instead near to, for example, the edge lying opposite the first bending, a pivoting of the entire workpiece results by this rotation, thus another position of the 90° displaced edge, that however through a corresponding movement of the manipulator and the clamping jaws is balanced, so that the second edge to be bent is also bent into a favorable position within the bending machine without the manipulator having to regrasp it.

Additionally, grasping is also possible in a simple way because of the design of the clamping jaws and the possible movements.

BRIEF DESCRIPTION OF THE SEVERAL VIEWS OF THE DRAWINGS

The foregoing summary, as well as the following detailed description of preferred embodiments of the invention, will be better understood when read in conjunction with the appended drawings. For the purpose of illustrating the invention, there is shown in the drawings embodiments which are presently preferred. It should be understood, however, that the invention is not limited to the precise arrangements and instrumentalities shown. In the drawings.

DETAILED DESCRIPTION OF THE INVENTION

Figure 1:
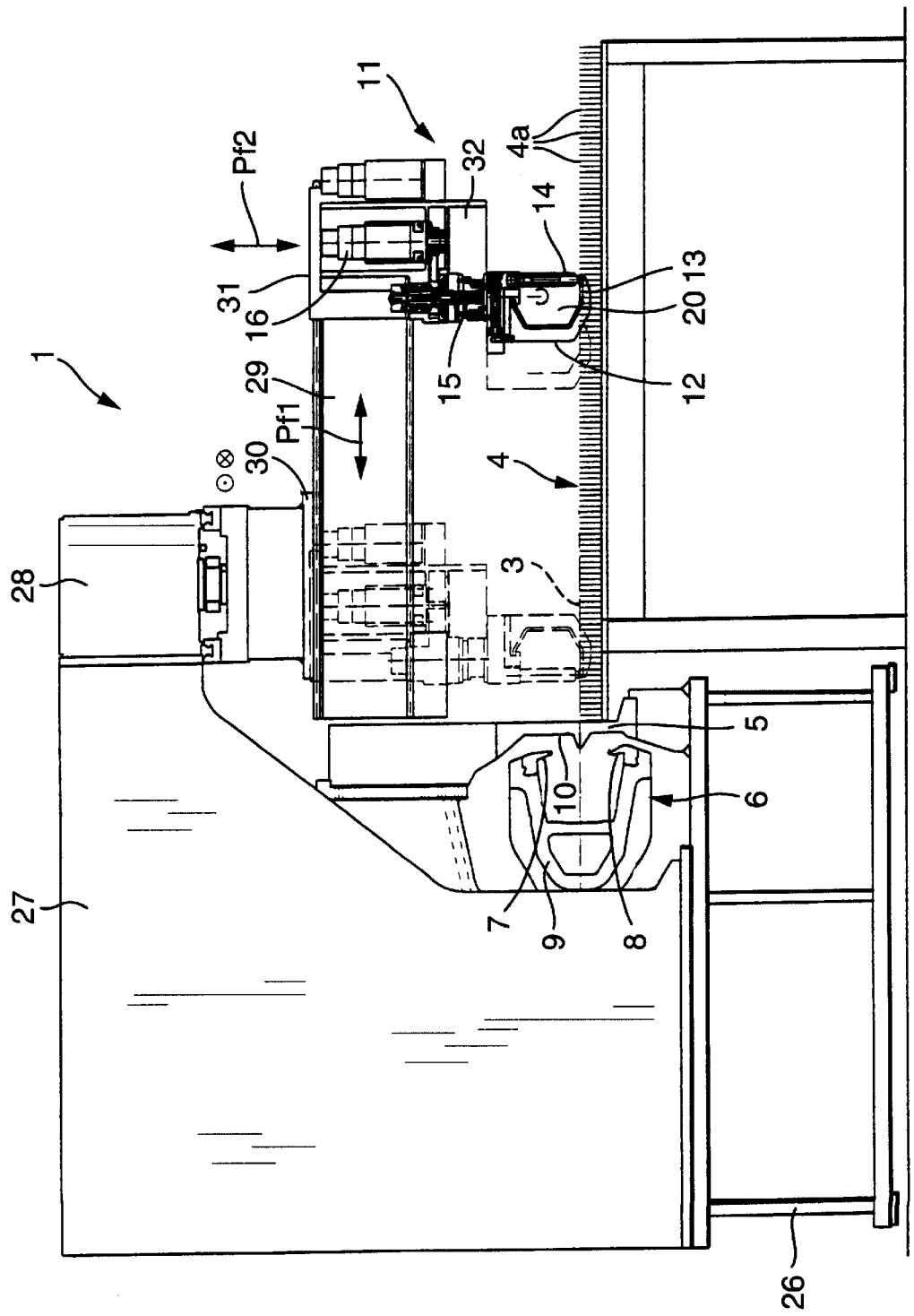
FIG. 1 is a side view of a processing machine according to the invention constructed as a bending machine having a manipulator with clamping jaws, arranged above the support for a workpiece and above the workpiece itself, that can be moved and rotated in multiple degrees of freedom both in the horizontal direction as well as vertically.

A bending machine indicated as a whole by 1 and is referred to as "bending machine 1" in the following description. It functions for the purpose of bending sheet-like workpieces 2, for example sheet metal parts or sheet metal plates, on the edges 3, so that singly-or multiple folded edges 3 result, as is shown, for example, in FIGS. 6 to 14 as well as FIGS. 18 to 20. The bent edges 3 can have different cross-sections, however, they run—with the exception of special cases according to FIG. 20—parallel to the edges.

The processing or bending machine 1 has a horizontal workpiece support 4, which is aligned with a pressure pad 5, which is also still a part of the workpiece support 4. Furthermore, the bending machine 1 has a processing or bending tool 6, which in the preferred embodiment carries an upper bending rail 7 and a lower bending rail 8 on a bending beam 9. Near to this processing tool 6, a hold-down clamp 10 is provided which acts together with the pressure pad 5 on the workpiece 2, so that it can be clamped near the tool 6 between the hold-down clamp 10 and the pressure pad 5 in order to be processed, especially for forming a bent edge 3.

Figure 16:
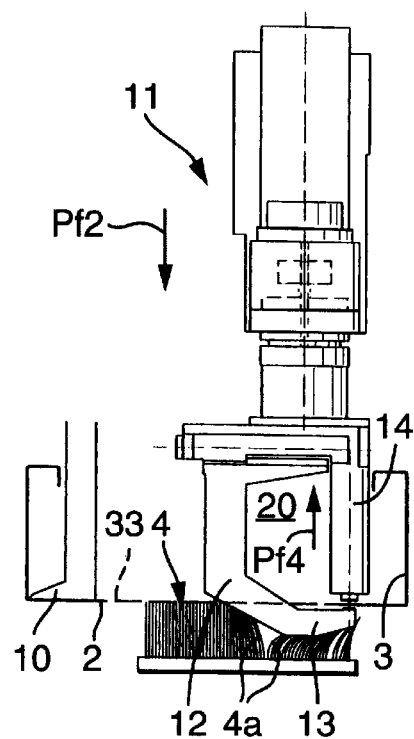
FIG. 16 is a view corresponding to FIG. 15, after the release of the upper grip from the lower grip.
Figure 17:
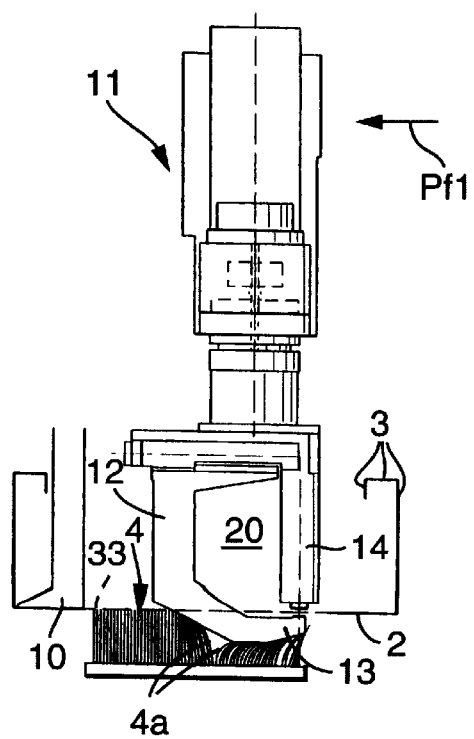
FIG. 17 is a view corresponding to FIGS. 15 and 16, in which the clamping jaws are moved from the mounting area towards the inside of the opening in order to be released from the workpiece.

The bending machine 1 has a manipulator designated as a whole as 11 with clamping jaws 12 with which the workpiece 2 is grasped and conveyed to the processing machine 1, as well as the workpiece support 4 and the mounting device which includes the pressure pad 5 and the hold-down clamp 10. The clamping jaws 12 have a lower grip 13 and an opposing upper grip 14 which is at least partially vertically movable in the usage position, so that the workpiece 2 can be held by the clamping jaws 12 between the lower grip 13 and the upper grip 14, as will be recognized from FIGS. 6 to 17, where in FIG. 16 the release of the clamping jaws 12 from the workpiece 1 by an upward movement of the upper grip 14 away from the lower grip 13 is depicted.

In a manner yet to be described, the clamping jaws 12 can be moved transversely or at a right angle to the edge 3 to be processed of the workpiece 2, approximately in the plane of the workpiece 2 or in a parallel plane to that, or moved transversely or at a right angle to the tool 6 and thus also to the extension of the pressure pad 5 and the hold-down clamp 10 as indicated, for example, in FIG. 1 by the double arrow Pf1. In addition, the movement possibilities are recognized, for example, by the comparison of the FIGS. 7 and 8 or FIGS. 13 and 14 or FIGS. 16 and 17. Thus, using the clamping jaws 12, a workpiece 2 can be grasped and supplied on the workpiece support 4 to the area of the tool 6 or also, moved back away from there.

In addition, a rotation of the workpiece 2 around a vertical axis 15 is also possible, so that the bending steps indicated in FIGS. 18a to 18d, in FIGS. 19a to 19c and FIG. 20, are possible, in which several edges 3 of a sheet metal piece or workpiece 2 arranged at an angle to each other, are bent one after the other, where this workpiece 2 is held and respectively rotated by the clamping jaws 12 of the manipulator 11.

Figure 2:
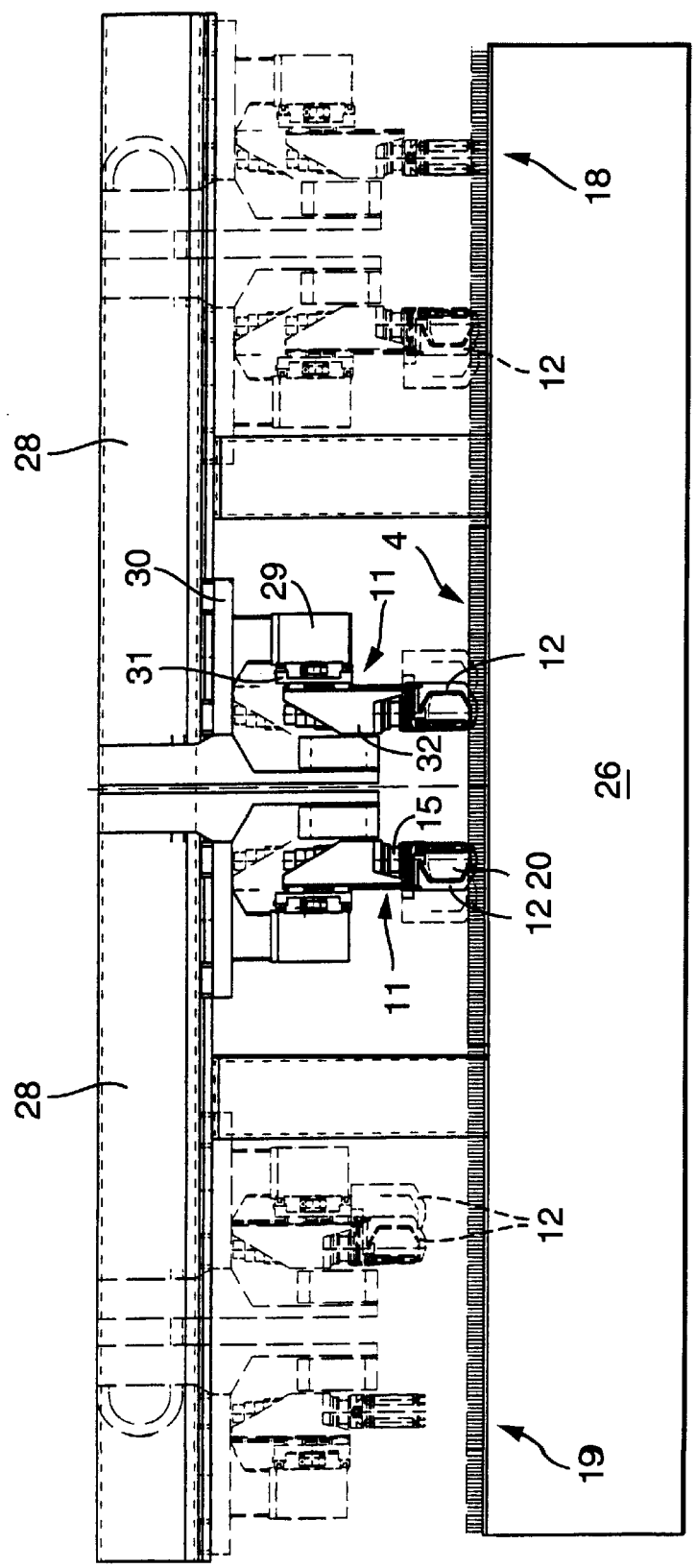
FIG. 2 is a front view of the bending machine according to FIG. 1 rotated 90° from FIG. 1, seen from the side of the workpiece feed, where the bending machine is provided with two manipulators so that selectively sized workpieces or even two separate workpieces can be grasped and processed simultaneously or one after the other.

In all of the drawings, it is easily recognized that the manipulator 11 is located and supported above the processing plane of the workpiece 2 and above the support 4 for the workpiece 2, and as shown most clearly in FIG. 2, the clamping jaws 12, in addition to having a capacity for movement transversely or perpendicular to the workpiece edge 3 to be processed, can also be adjusted parallel to the workpiece edge 3, thus parallel to the extension of the tool 6, the pressure pad 5 and the hold-down clamp 10, and consequently generally parallel to the bending edge.

The possibility already mentioned for rotating the workpiece 2 around a vertical axis is thus created in that the clamping jaws 12 are rotatably supported about the axis 15 which extends perpendicular to the workpiece plane and the workpiece support 4. The clamping jaws 11 are rotatable as a whole and can thus also rotate a workpiece 2 held therein about the axis 15.

Figure 4:
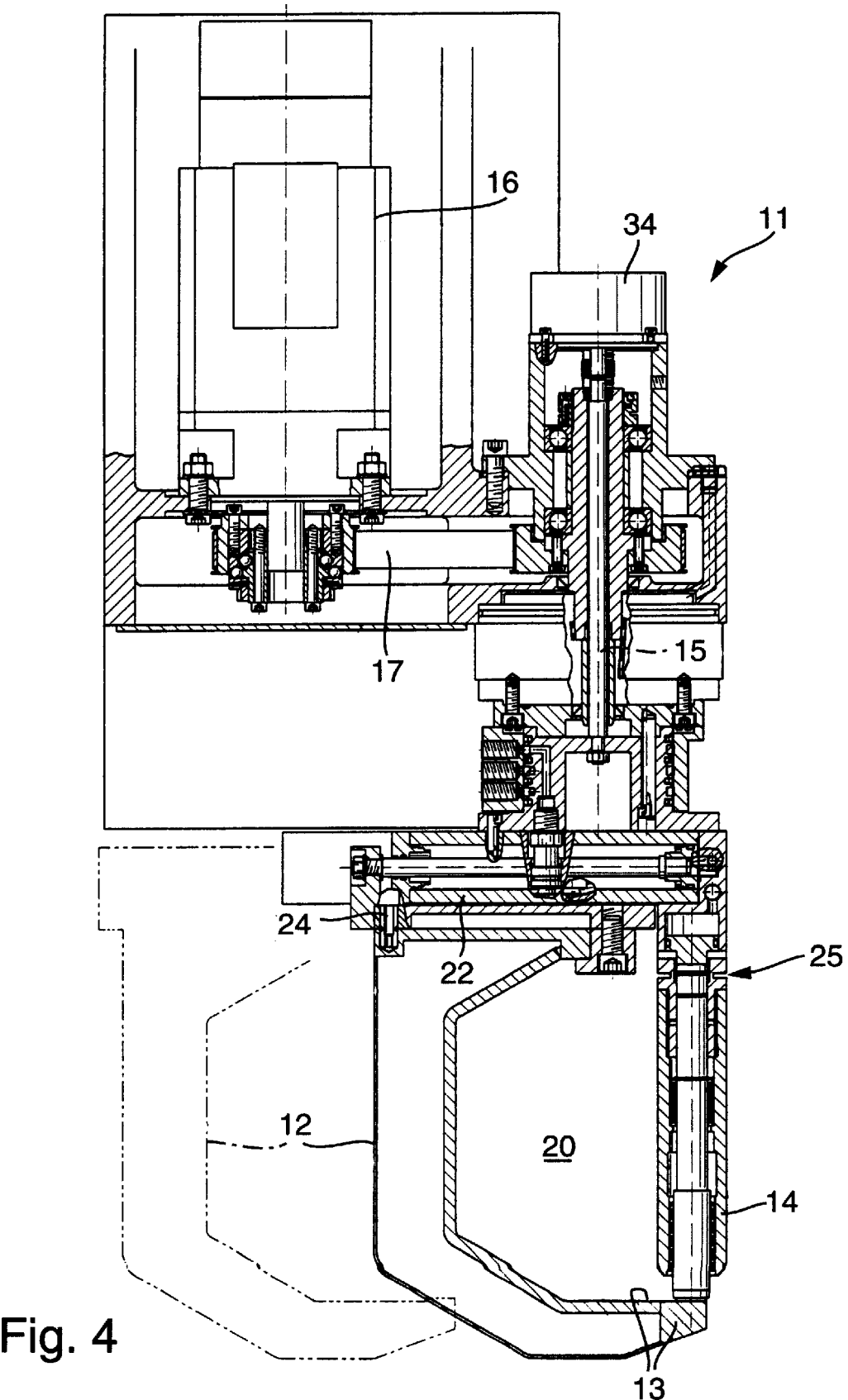
FIG. 4 is an enlarged longitudinal view, partially in cross-section, showing the embodiment of the manipulator with the supports for the clamping jaws.

As shown in FIG. 4, a drive motor 16 rotates the clamping jaws 12 about the axis 15 with the help of a belt drive 17.

Figure 11:
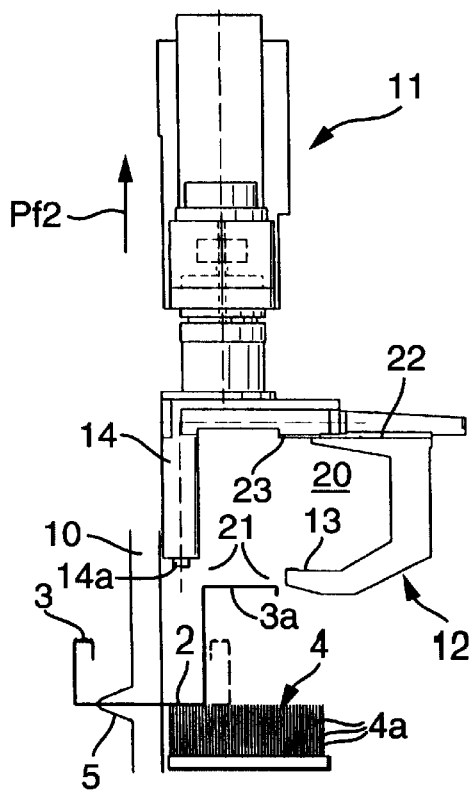
FIG. 11 is a view corresponding to FIGS. 9 and 10, after the opened clamping jaws are lifted from the bent workpiece.
Figure 13:
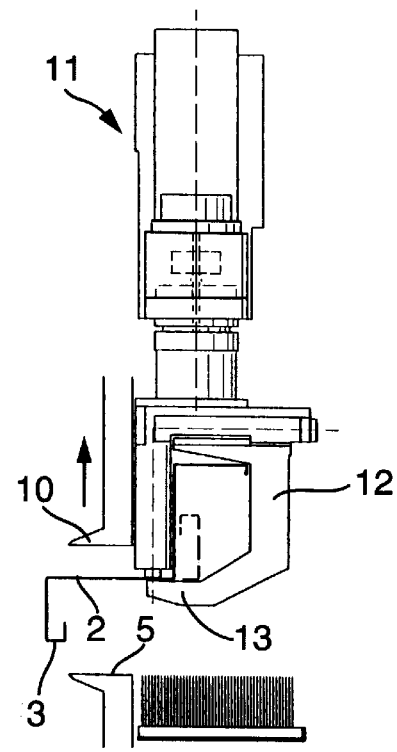
FIG. 13 is a view similar to FIG. 12, after the workpiece has been lifted from its support position using the clamping jaws by more than the dimension of the downwardly bent edge.
Figure 14:
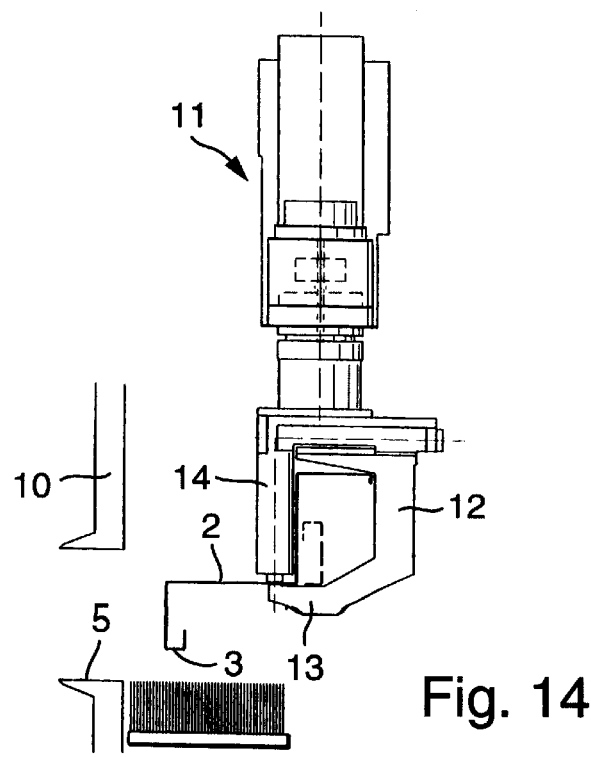
FIG. 14 is a view corresponding to FIGS. 12 and 13, in which the bent workpiece is moved outward from the area of the hold-down clamp using the manipulator which is grasping it.
Figure 15:
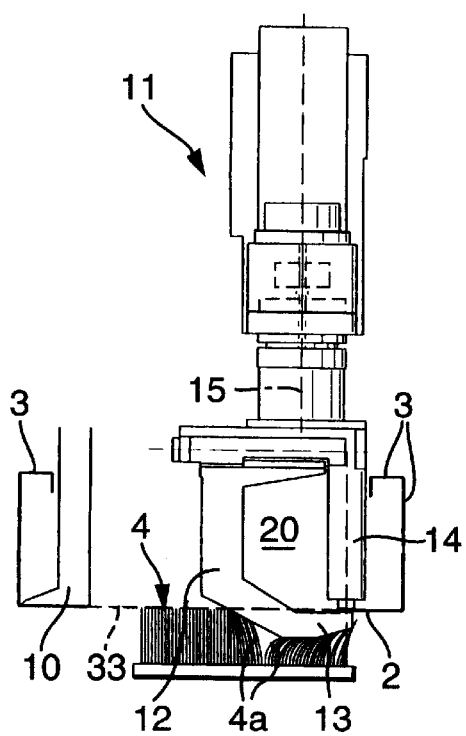
FIG. 15 is a side view of the manipulator which grasps a workpiece from inside through an opening in the workpiece on an edge bordering the opening.

By the vertical double arrow Pf2 in FIG. 1, it is indicated that the manipulator 11 can be adjusted as a whole in the direction perpendicular to the processing plane or workpiece support 4 and can be lifted upwardly, and from such a raised position however, can understandably also be lowered back. In this way, the clamping jaws 12 can be arranged at different height positions, as indicated in FIGS. 11, 13 and 14. Most of all, for a feed or carry-off operation for a workpiece 2, this vertical lifting capability is advantageous. Furthermore, the clamping jaws 12 can grasp onto those workpieces 2, which are not flat, but are profiled as is indicated, for example, in FIGS. 6 to 8. If a workpiece has two folds and thus several planes, the respectively favorable position of the workpiece 2 in different height positions can be grasped by use of the height adjustability (see for example, FIGS. 6 and 7).

Figure 3:
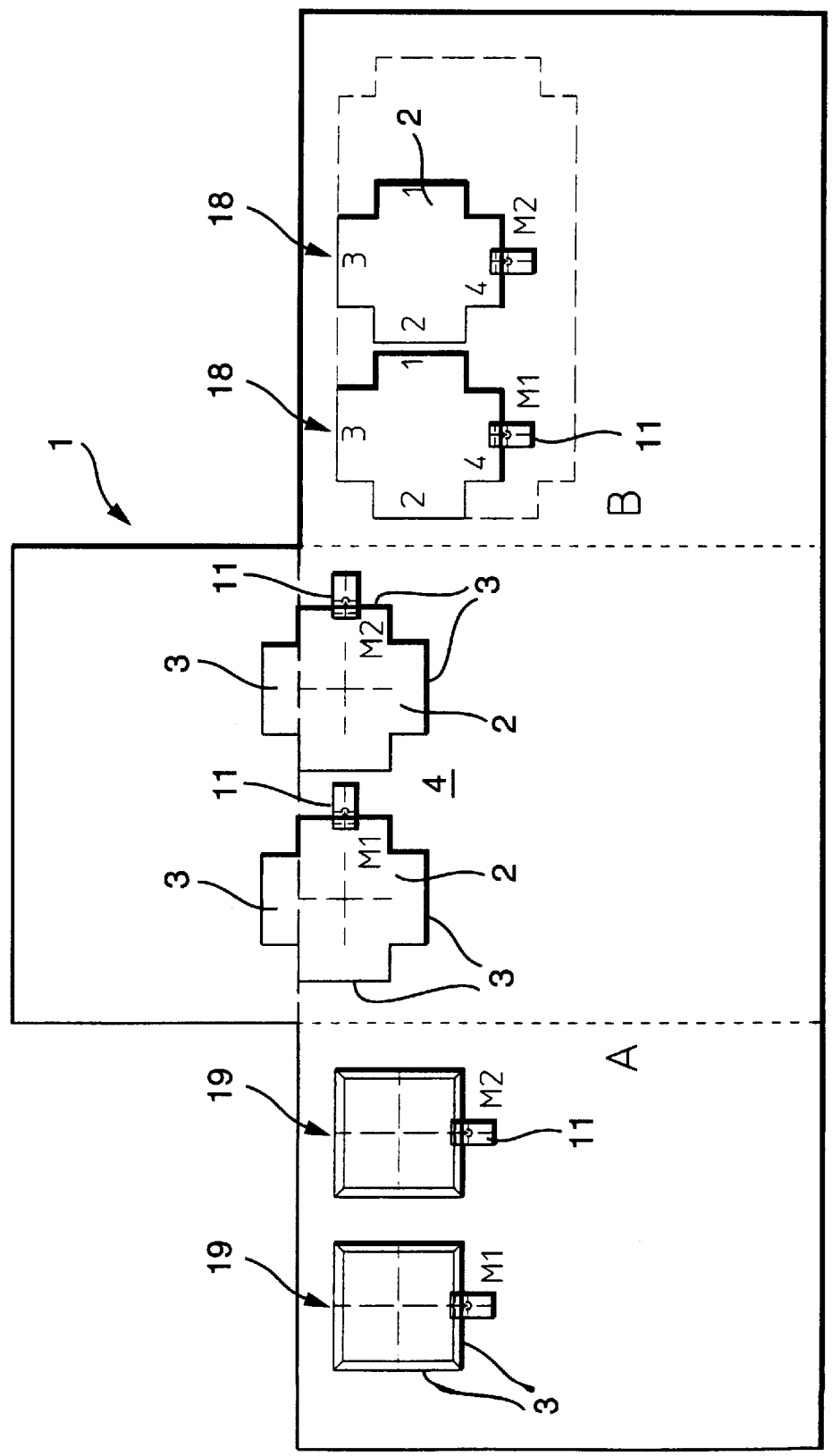
FIG. 3 is a schematic overhead view of the bending machine according to FIG. 2, where metal sheet constructed workpieces are depicted two at a time in an alignment station and in the actual bending machine as well as finally in a deposit place for the finished parts, and the workpieces can each be grasped and processed with the two manipulators according to FIG. 2.

In FIG. 3, a schematic overhead view of the bending machine 1 is depicted in which there is more than one pick-up position 18, in this case two such pick-up positions 18 for workpieces 2, which are all located within the movement area of the manipulator 11 and thus also the clamping jaws 12 such that the respective workpiece 2 are properly positioned in these pick-up positions 18 for further processing, so that it can be grasped by the manipulator 11 and the clamping jaws 12 and can be conveyed to the bending machine 1 and its bending tool 6 directly and without the need for orientation in the bending machine 1.

In FIG. 3, it is indicated, and is also more clearly depicted in FIG. 2, that the processing machine 1 in this case has at least one additional manipulator 11 having clamping jaws 12, thus it can be constructed as a twin machine, in order, for example, to be able to simultaneously process two workpieces or metal sheets 2 or supply a workpiece 2 to the bending machine and the bending tool 6, while an already processed workpiece 2 is transported to a storage area 19 for finished, processed workpieces.

Figure 7:
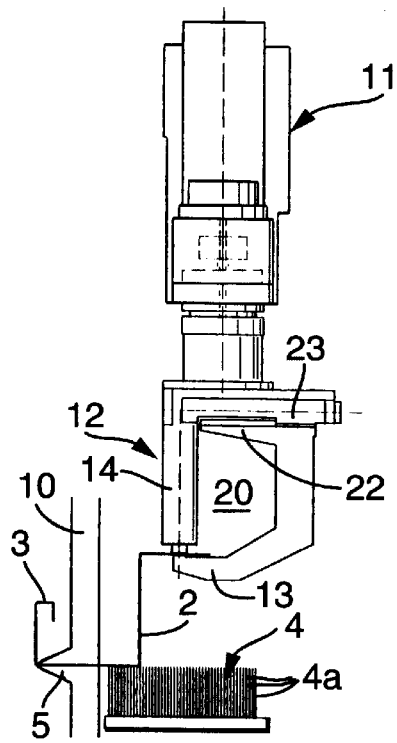
FIG. 7 is a view corresponding to FIG. 6, in which the clamping jaws grasp the bent edge of a small workpiece.
Figure 8:
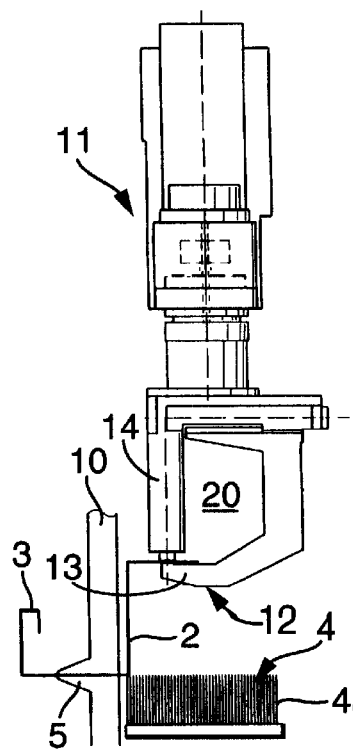
FIG. 8 is a view corresponding to FIG. 7, in which the workpiece is adjusted relative to the bending tool and its hold-down clamp, using the manipulator.
Figure 9:
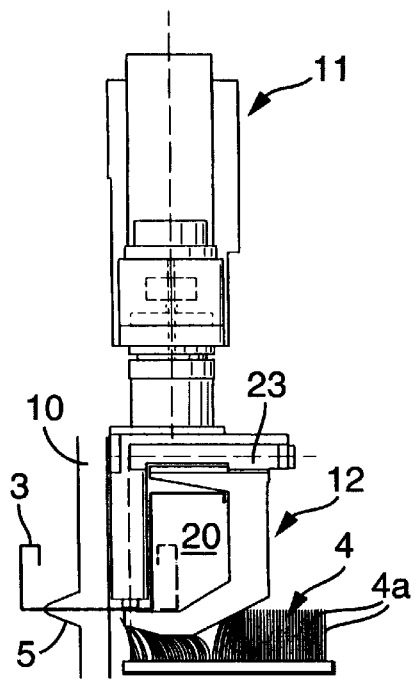
FIG. 9 is a side view of the clamping jaws as they grasp a bent part in the front-most position.
Figure 12:
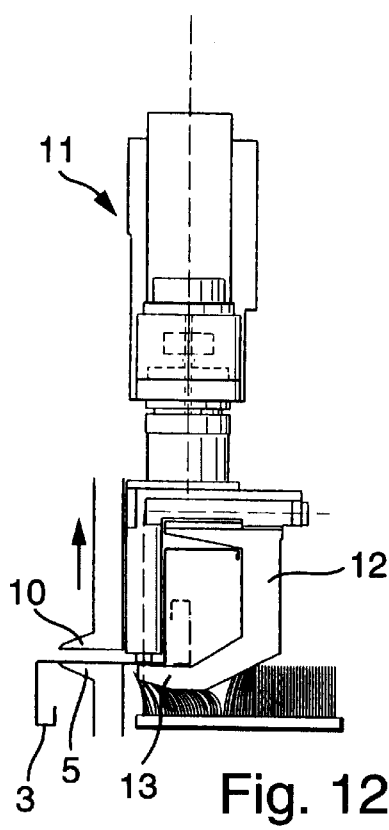
FIG. 12 is a side view with clamping jaws in which a workpiece is grasped, and a last downward bend is provided opposite the hold-down clamp, in which the hold-down clamp is opened.

In FIG. 1, especially however in FIG. 4 and further in FIGS. 6 to 17, it is depicted that the upper grip 14 opposite the lower grip 13 of the clamping jaws 12 has or forms an open area 20, so that an already profiled edge 3 of the workpiece 2 can also be surrounded when the clamping jaws 12 are closed, as is indicated for example in FIGS. 12 to 14 or also in FIG. 9. According to FIGS. 10 and 11, the lower grip 13 can be moved, for accessing this open area 20 and for releasing a workpiece 2, relative to its closing position away from the area of the upper grip 14.

Figure 10:
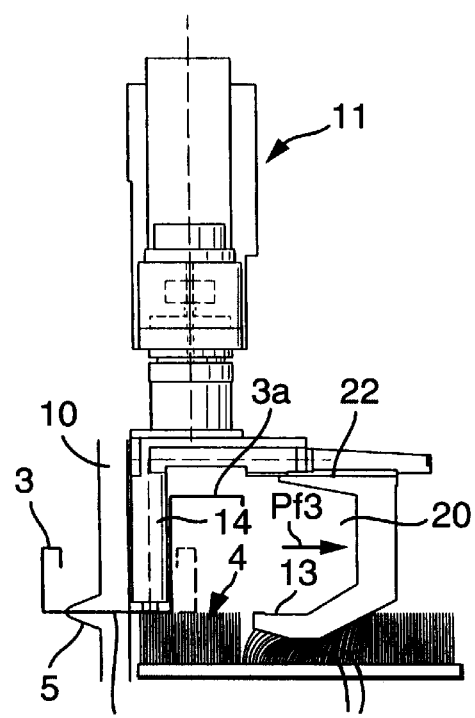
FIG. 10 is a view corresponding to FIG. 9, after the lower grip has released and the clamping jaws are opened.

In the preferred embodiment, the lower grip 13 can be moved in the horizontal direction parallel to the workpiece 2 and perpendicularly to its edge 3 for releasing the workpiece 2 from the open area 20 opposite the upper grip 14, as will be recognized by a comparison of FIGS. 9 to 11. The shift of the lower grip 13 away from the upper grip 14 is indicated in FIG. 10 by the arrow Pf3. The shifting path is sufficiently sized, in order to provide between the upper grip 14 and the lower grip 13 a downwardly open gap or a space 21, through which a bent edge 3a can also be moved out as is indicated in FIG. 11.

As previously noted, the upper grip 14 can be moved vertically to generate a clamping force opposite the lower grip 13, which can be moved in the horizontal direction according to the arrow Pf3 for opening. The releasing movement of the clamping force is thus indicated in FIG. 16 by the upwardly directed arrow Pf4. If the upper grip 14 is moved opposite the arrow Pf4 to the lower grip 13, a workpiece 2 located there can be grasped and clamped.

Figure 5:
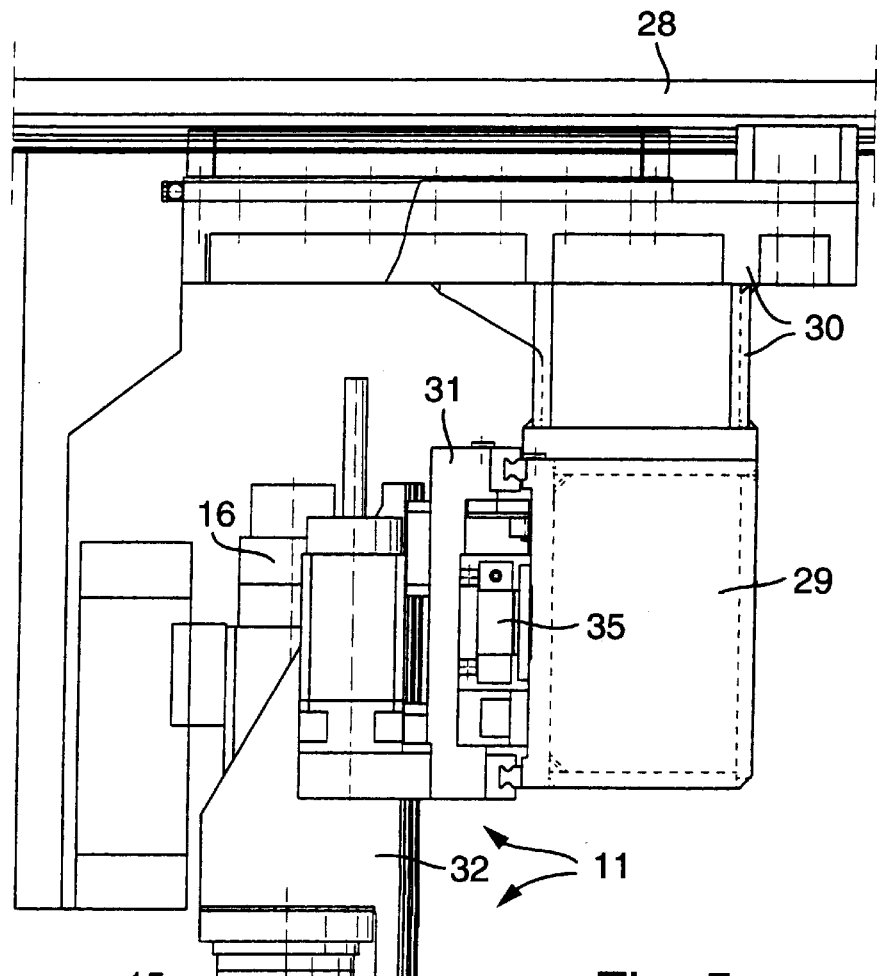
FIG. 5 is a view of the manipulator and the clamping jaws, rotated 90° from FIG. 4, which has two parallel clamping dies on the upper grip, opposite to the lower grip.
Figure 5A:
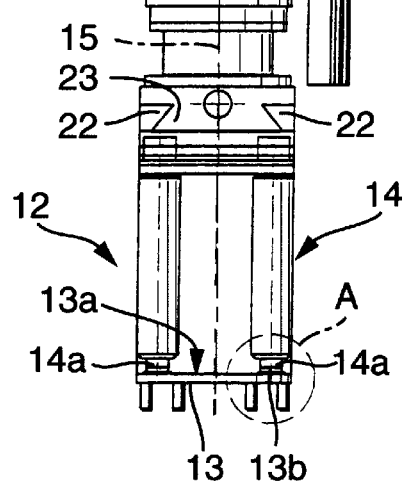
FIG. 5a is an enlarged view of the detail marked "A" in FIG. 5 with the point of application of a clamping die of the upper grip of the clamping jaws on the corresponding lower grip.
Figure 5A:
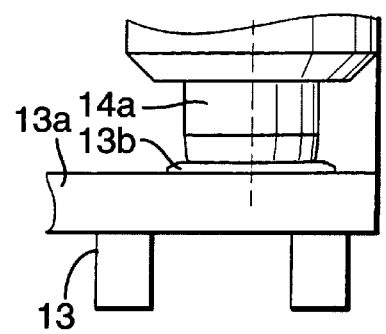

In FIG. 5, a preferred embodiment of the upper grip 14 is shown which includes or has at least two clamping dies 14a that can be moved in the vertical direction for clamping and release. These clamping dies 14a make possible a better holding of a workpiece 2 grasped by the clamping jaws 12 by being spaced apart from each other. The lower grip 13 has, opposite the upper grip 14, an undivided support surface 13a, which, however, in the area of the clamping die(s) 14a of the upper grip 14 has a raised or heightened opposing surface 13b for the respective clamping dies 14a, so that defined, spaced apart clamping positions between the upper grip 14 and the lower grip 13 result. Accordingly, a workpiece 2 can be grasped fixedly and securely in its edge area 3.

On the clamping jaws 12, other ways can be used to provide the at least two clamping positions set at a distance apart from each other. For example, using only one clamping cylinder or clamping die 14a, which would then be arranged approximately in the middle, a clamping rocker, can be arranged on its lower end having both clamping positions for acting together with the opposing surfaces 13b of the lower grip 13. This rocker, which is not shown in greater detail, is supported so that it can be pivoted about a central axis that is oriented approximately perpendicularly to such a clamping die. Also in this way, possible slight mass deviations of the workpiece could be offset during the grasping with the clamping jaws 12, such that nevertheless, an improved manipulation ability is simultaneously achieved via two clamping positions for performing rotational movements.

In FIG. 5, in addition the sliding guide 22 will be recognized, in this case is a dovetail guide, with which the movable lower grip 13 is connected to the upper grip 14 so that it can move. From FIGS. 1, 4 as well as 6 to 17, it is clear that the lower grip 13 has an approximately C-shaped outline or is a C-shape, such that the inside of this "C" forms at least one part of the open area 20 of the clamping jaws 12 and the lower leg that is approximately horizontal in the usage position forms the actual lower grip or the support surface 13a with the opposing surfaces 13b, and the upper leg forms the guide piece 22 of the lower grip and at the same time, the rigid connection of the lower grip 13 to its suspension or slide support 23. In spite of the movability of the entire lower grip 13 relative to the upper grip 14, a high clamping force can be transferred between the lower grip 13 and the upper grip 14 and introduced into the guide 22, that is relatively long in the slide direction, and the slide support 23.

In the preferred embodiment, the workpiece support 4 is formed by the raised bristles 4a so that a workpiece 2 can be easily moved on this workpiece support 4 without the danger of surface damage occurring. The lower grip 13 is shaped as a runner, rounded off or chamfered on its underside opposite the movement directions so that it can be easily moved against the workpiece support 4 and the bristles 4a, as indicated in FIGS. 6, 9, 10 or 15 to 17.

According to FIG. 4, the lower grip 13 and the upper grip 14 of the clamping jaws 12 each have a break-off position 24 and 25. By this it is ensured that in case of a collision of a deformed or damaged workpiece 2, for example, with the machine frame 26, an easily replaced part breaks intentionally such that the guides of the manipulator 11, described below, are not damaged. The break-off positions 24 and 25 are thus arranged between an easily replaceable part of the clamping jaws 12 and its remaining parts or the manipulator 11.

The break-off position 24 for the lower grip is formed in the preferred embodiment by a weak or weakened mounting screw for attaching the lower grip 13 to its sliding guide 22. The upper grip 14 has a ring groove as the break-off position 25, such that a intentional deformation or an intentional break is planned.

It has already been noted that the manipulator 11 is suspended above the workpiece and workpiece support 4. In FIG. 1, it will be recognized that the suspension and support for the manipulator 11, arranged above the workpiece and workpiece support 4, and explained in greater detail in the following, is connected directly to the machine frame 26 of the bending machine , by a stand 27, so that practically a direct connection between the machine frame 26 and the manipulator 11 results. The stand 27 could, however, also be its own stand, which is arranged in the area of the mounting surface with the machine frame 26 at a defined distance and can be fixed in position. While thus according to FIG. 1 in the preferred embodiment, the machine frame 26 and mounting stand 27 form a unit for the manipulator 11 and its guides, they can also have fixed sites on a common foundation or on two foundations which are also arranged independently of each other and set off at a predetermined distance.

For the already mentioned different adjustment possibilities of the manipulator 11, it is essential that an additional guide girder 29 is arranged horizontally, but perpendicular to a support guide 28 on the processing machine 1 or the machine frame 26, and in the preferred embodiment on the horizontal guide support 28 on the stand 27, which runs parallel to a processing side of a workpiece 2 and parallel to the pressure pad 5 and hold-down clamp 10. The guide girder 29 is connected to the guide support 28 via a support carriage 30. By the adjustment of the support carriage 30 along the guide support 28, the guide girder 29 can thus be brought into different positions and thus be adjusted because of the correspondingly measured length or extension of the guide support until reaching the area of the pick-up positions 18 on the one side and the deposit position 19 on the other side, as indicated in FIG. 2.

The guide girder 29 carries, according to FIG. 1, a horizontally movable adjustment carriage 31, so that the movements of the manipulator 11 can be performed in all the positions of the guide girder 29 perpendicular to the tool 6, the pressure pad 5 and the hold-down clamp 10 and the corresponding bending line. On this adjustment carriage 31, a vertically adjustable mounting carriage 32 is arranged for movement according to the double arrow Pf2 in FIG. 1, on which the clamping jaws 12 are rotatably mounted, as already described. From this total construction, degrees of freedom result which allow the manipulator 11 or the clamping jaws 12 be adjusted and rotated so that a workpiece 2 can perform correspondingly many movements. According to FIG. 18, for example, a workpiece 2 with an edge to be folded can be brought between the pressure pad 5 and hold-down clamp 10, such that in FIG. 18a the first edge to be bent is indicated as "edge side 1".

Figure 18A:
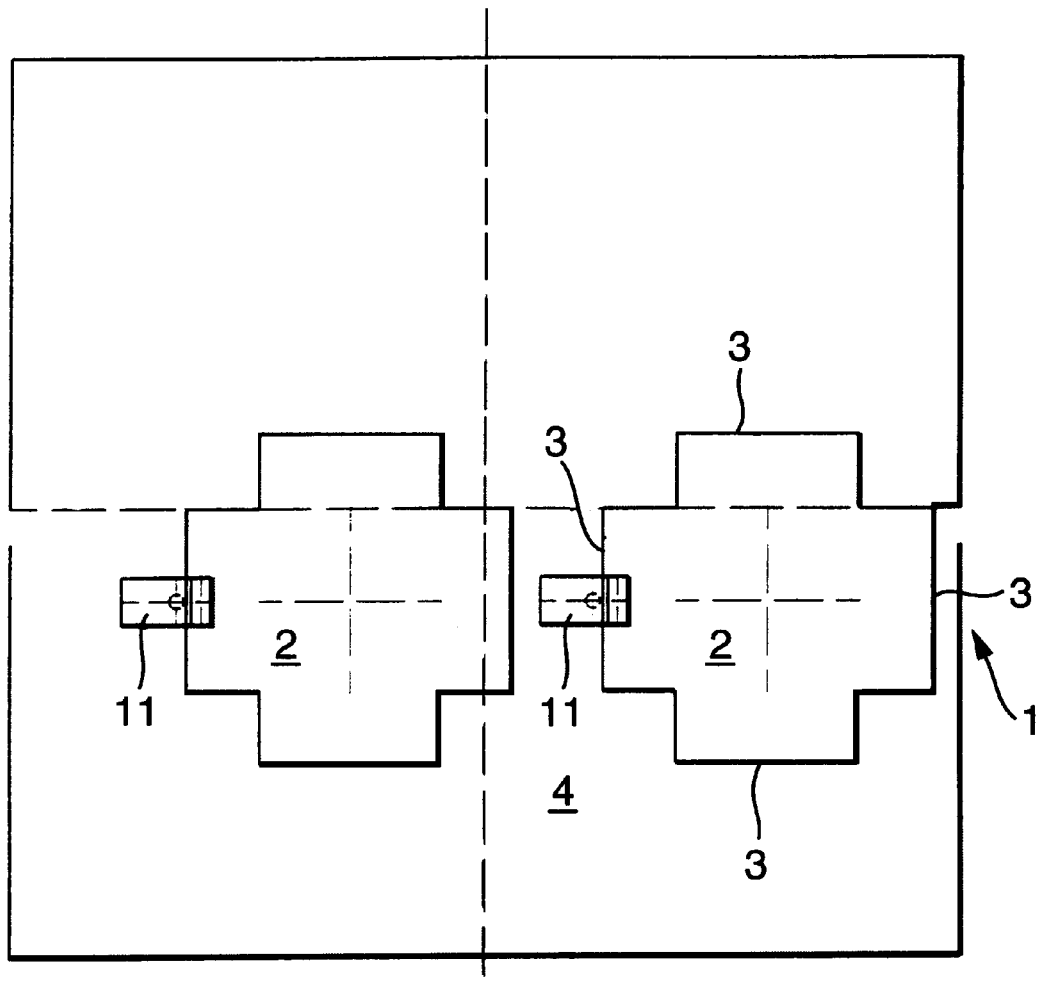
FIGS. 18a to 18d show overhead views of a bending machine for the bending of two workpieces simultaneously, with the bending sequence during synchronous bending of the two workpieces on three or four side edges being depicted.
Figure 18B:
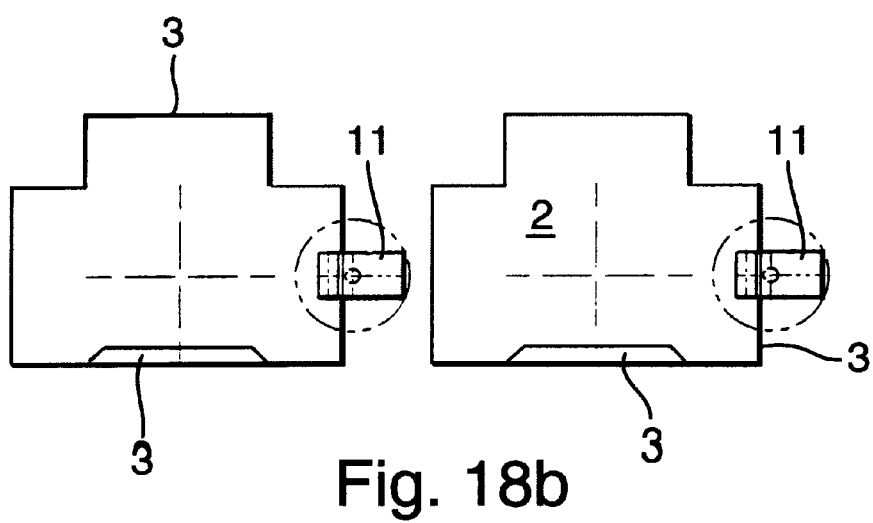
Figure 18C:
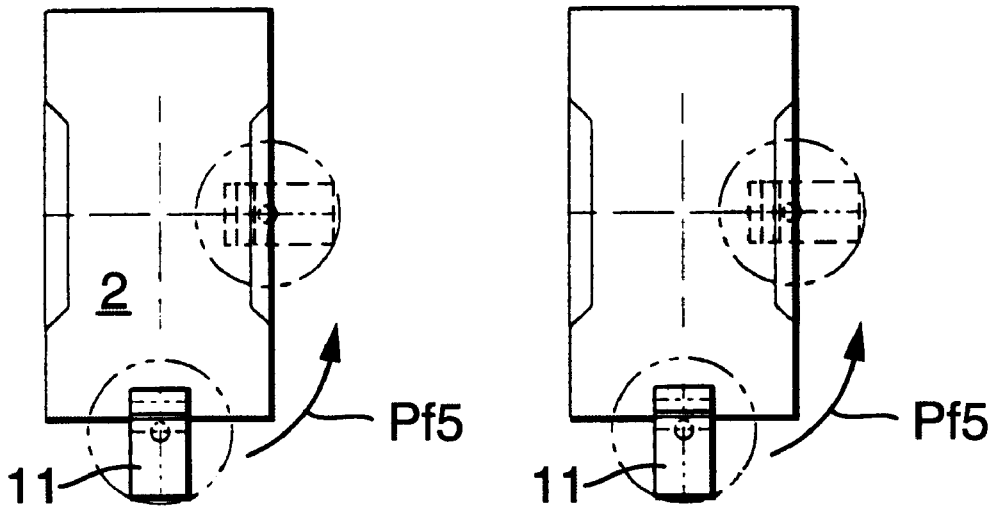
Figure 19A:
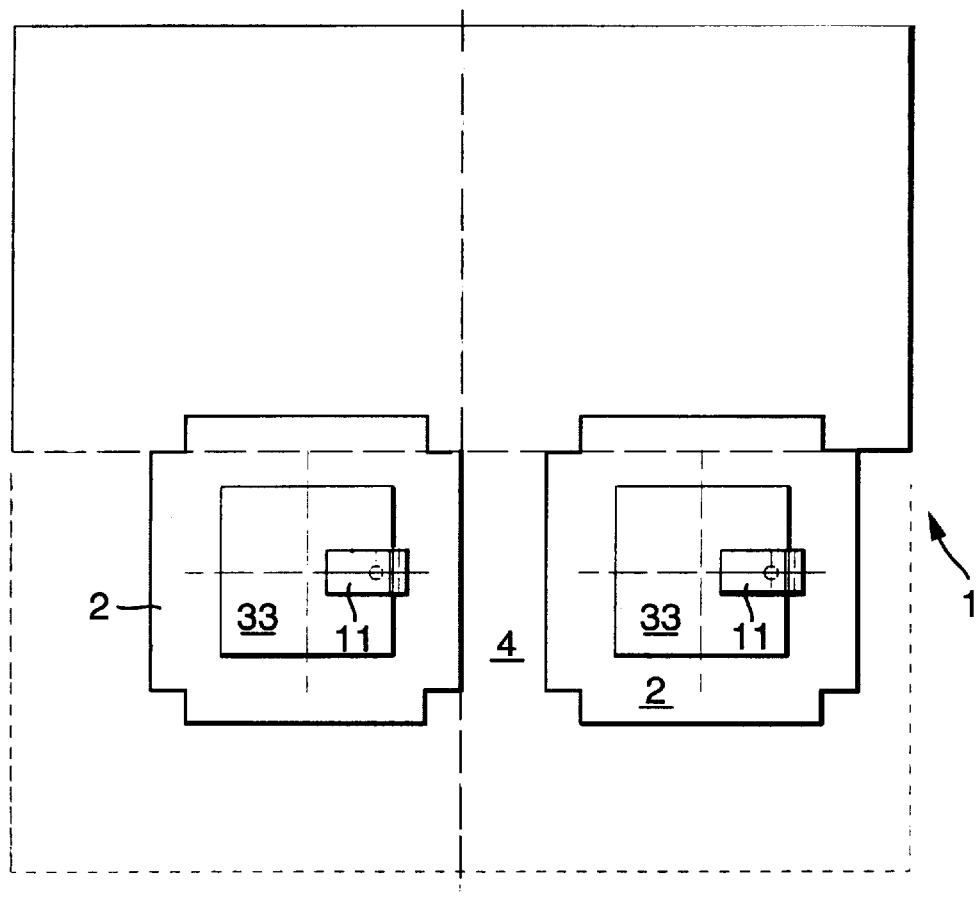
FIGS. 19a to 19c show overhead views of a bending machine having two manipulators and the bending sequence of workpieces having a central opening through which the clamping jaws grasp from the inside.
Figure 19B:
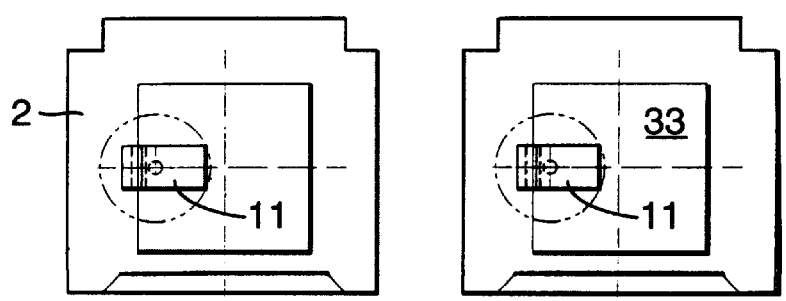
Figure 19C:
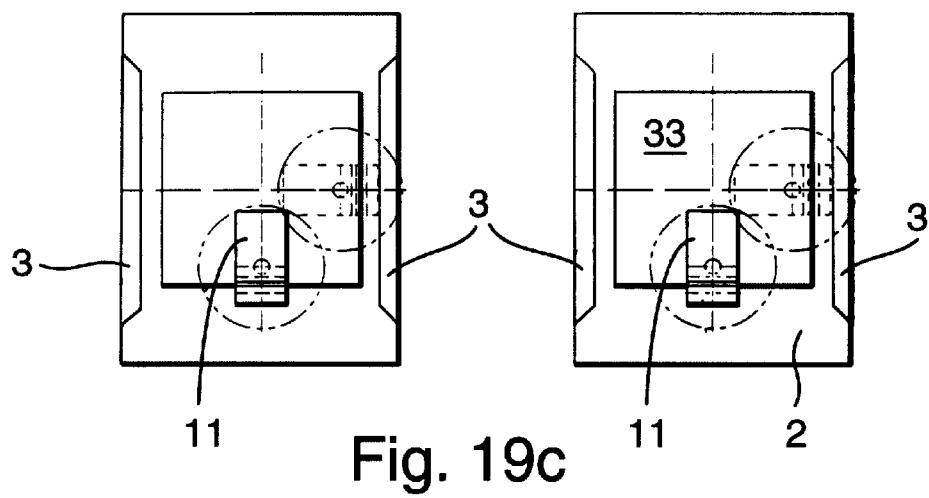

According to FIG. 18b, the manipulator 11 and the clamping jaws 12 can be rotated from the position depicted in FIG. 18a, on the one hand, by 180° and on the other hand, in the direction of the bending line, so that the edge lying across from the now bent first edge, indicated as "edge side 2" in FIG. 18b, extends into the area of the bending tool 6. After the bending of this second edge "edge side 2", the manipulator is rotated according to FIG. 18c by 90° and in addition, moved away from the bending line or the bending tool 6, in order to bring the third edge "edge side 3" into the area of the bending line and the bending tool 6. Thus, it is indicated in FIG. 18c that in addition the clamping jaws 12 are released from the workpiece 2 and moved relative to it, so that the workpiece is grasped as indicated by the bent arrow Pf5. Because of the open area 20, the clamping jaws 12 can grasp the already bent edge.

Figure 18D:
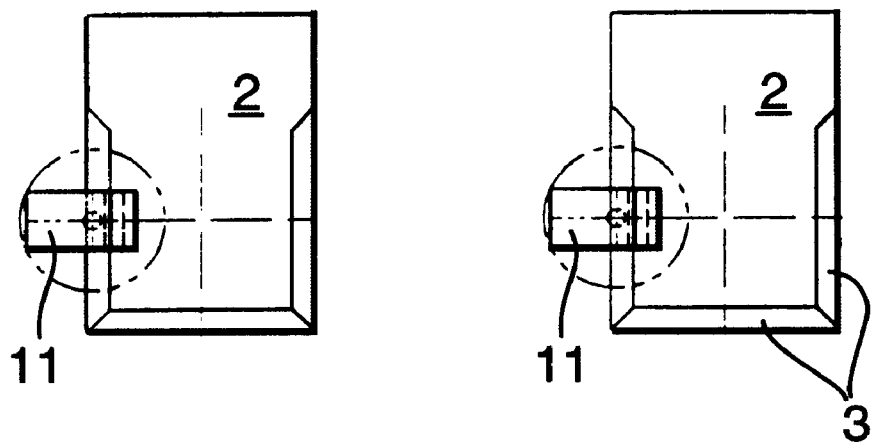

As shown in FIG. 18d, in order to also be able to bend the fourth edge "edge side 4", the clamping jaws 12 are then turned back again by 180° so that it is in regard to its orientation, arranged again in the position according to FIG. 18a, at the same time, moved somewhat in order to take into account the dimensions changed by the folding of the workpiece 2.

After that, the workpiece can be moved away out of the bending machine 1 using the manipulator 11 and the clamping jaws 12. Then, the hold-down clamp 10 is moved in the direction of the arrow Pf6 to the top, and the workpiece 2 is lifted, using the manipulator 11 and the clamping 12, in the same direction, because in this example, one of the edges is folded downwardly. Then, according to FIG. 14, the workpiece is moved away from the bending line 6 at a right angle where it can be transported to the deposit area 19.

Figure 6:
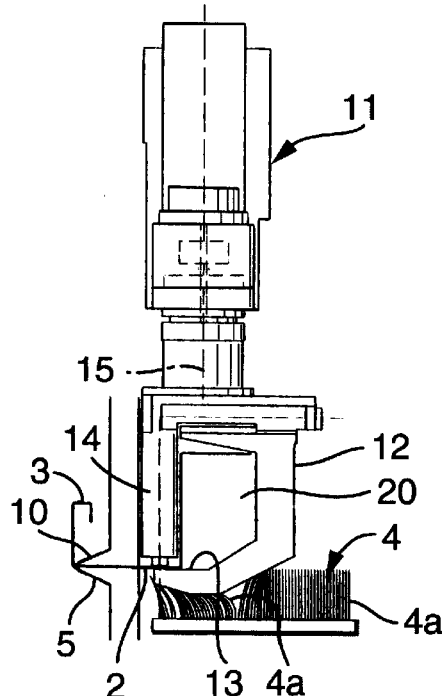
FIG. 6 is a side view of the clamping jaws in the usage position, with which a workpiece located in the bending position is grasped on an edge which is already bent such that a bent edge is accommodated in an open area of the clamping jaws.

In FIGS. 6 to 8, it is shown that during grasping on a small workpiece 2 on a bent edge, the manipulator and the clamping jaws 12 can be lifted somewhat, in order to grasp an edge lying at a higher level.

In FIGS. 15 to 17 and 19, it is shown how the clamping jaws 12 grasps a workpiece having an opening or breakaway 33 located between the edges of the workpiece from the inside and thus likewise by turning and moving can bend one "edge side" toward the other one, where under certain circumstances, a wrap-around can in turn take place. For a wrap-around of this type, the clamping jaws 12 can be moved according to FIG. 17 from the inside edge into the opening 13.

Figure 20:
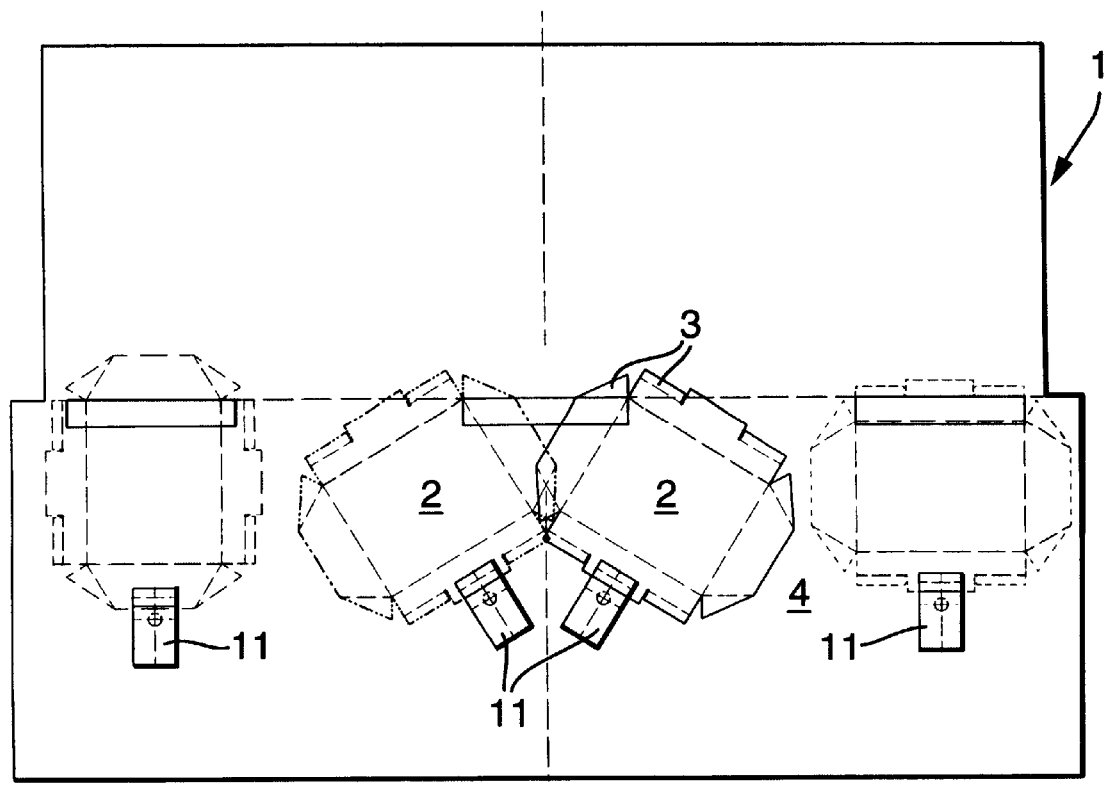
FIG. 20 is an overhead view of a bending machine with a representation of the manipulator in the pivoted position, where additional bendings are also possible especially if the bending tool is divided.

In FIG. 20, it is shown in a schematic overhead view of a bending machine that there is also the possibility for the manipulator 11 and the clamping jaws 12 to arrange the workpieces 2 in a position rotated less than 90° and to provide bends in the edge areas on the edge sides located on the borders because of the different movement possibilities and degrees of freedom in three axes, especially for a divided tool 6 and corresponding divided hold-down clamp 10 and pressure pad 5. The manipulator(s) is/are then not rotated by 90° and 180°, etc., but instead by an angle smaller or possibly larger.

It should be mentioned in the process that in FIGS. 18, 19, and 20, following from FIGS. 2 and 3, one bending machine is shown each time, in which two manipulators 11 and clamping jaws 12 are present, so that two workpieces 2 can be processed simultaneously. Instead of this, of course, a very large workpiece 2 could also be grasped at the same time by both manipulators.

The synchronous processing of two workpieces 2 at the same time accelerates production and makes economization easier. Furthermore, the possibility is created for grasping a workpiece 2 with the one manipulator 11 and supplying it to the processing machine 1, while the second manipulator 11 transports an already processed workpiece 2 further.

It should also be mentioned, that on the carriages 30, 31, and 32 and/or the sliding guides, path transmitters can be arranged, and on the rotational support of the clamping jaws 12, a rotational transmitter 34 (FIG. 4) can be arranged, and these transmitters can be connected with the controller of the processing machine 1 so that repeating movement runs can be programmed. For as precise adjustment movements as possible, it is preferred that for the adjustment of the two horizontally adjustable carriages 30 and 31, play free, electric, direct-linear drives 35 (FIG. 5) are provided. In the described embodiment with two manipulators 11 it is especially advantageous if these are arranged on the same guide support 28 that can have a correspondingly large length.

The bending machine 1 makes it possible to bend the edges 3 on the sheet-like workpieces 2. The workpieces 2 can thus be grasped by clamping jaws 12 located on a manipulator 11 and supplied to a tool 6 and a mount. Since the manipulator 11 is located and supported above the processing plane and workpiece support 4, and the clamping jaws 12 can, in addition to a moving capability oriented crosswise or perpendicular to the tool 6, also be adjusted parallel to it, and moreover are rotatably supported to rotate about an axis 15 extending at a right angle to the workpiece plane, the workpieces 2 can be grasped at any position and then supplied, eliminating the need for additional supplying, conveying, and removal devices, because all of these functions can also be performed by the manipulator 11.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. Bending machine (1) for sheet-like workpieces (2) for creating bent edges (3), the bending machine having a horizontal workpiece support (4) and having a bending tool (6) that has a bending beam (9) as well as having a hold-down clamp (10) for the workpiece (2) arranged near the bending tool (6), the bending machine (1) has at least one manipulator (11) with clamping jaws (12) for grasping the workpiece (2), the clamping jaws (12) include a lower grip (13) and an opposing upper grip (14) that is movable vertically with respect to the lower grip (13) in a usage position, the upper grip having an open area (20) for surrounding a profiled edge (3) of the workpiece 2 when the clamping jaws (12) are closed, the lower grip (13), being movably mounted for movement away from a closed position, from an area of the upper grip (14) and the open area, in order to access the open area (20) the clamping jaws (12) being movable in one of a plane of the workpiece (2) and a parallel plane to the horizontal workpiece support (4) crosswise to the edge (3) of the workpiece (2) or crosswise to the tool (6) and rotation of the workpiece (2) about a vertical axis (15), the lower grip (13) being pivotable away from the upper grip (14) in a horizontal direction about the vertical axis (15), to a side of the open area (20) in order to release the workpiece (2) and access the open area (20), or movable as a whole, parallel to the workpiece support (4), the manipulator (11) being located and supported above the horizontal workpiece support (4) and the clamping jaws (12) being movable parallel to the hold-down clamp (10) and rotatably supported about the axis vertical (15) which extends at a right angle to the workpiece plane.

2. Bending machine according to claim 1, wherein at least one of the clamping jaws on the manipulator (11), the upper grip (14) of the clamping jaws (12), and the entire manipulator (11) can be adjusted upwardly in a direction perpendicular to the horizontal support member (4).

3. Bending machine according to claim 1, wherein the bending machine has at least one pick-up position (18) for sheet-like workpieces (2), which are arranged within a movement area of the manipulator (11) and the clamping jaws (12) which contain workpieces (2) in oriented position.

4. Bending machine according to claim 1, wherein the upper grip (14) is vertically movable in relation to the lower grip (13) to create a clamping force, and the lower grip is movable in a horizontal direction for opening.

5. Bending machine according to claim 1, wherein the clamping jaws (12) have at least two clamping positions.

6. Bending machine according to claim 5, wherein the upper grip (14) of the clamping jaws (12) includes at least one of a pair of clamping dies (14) and a clamping rocker which have two clamping positions and a clamping cylinder which acts upon them that is vertically movable for clamping and releasing.

7. Bending machine according to claim 1, wherein the upper grip includes clamping dies 14(a) and the lower grip has an undivided support surface (13a), which in the area of the clamping dies (14a) of the upper grip (14) includes respective raised opposing surfaces (13b) for the clamping dies (14a).

8. Bending machine for sheet-like workpieces (2) for creating bent edges (3), the bending machine having a horizontal workpiece support (4) and having a bending tool (6) that has a bending beam (9) as well as having a hold-down clamp (10) for the workpiece (2) arranged near the bending tool (6), the bending machine (1) has at least one manipulator (11) with clamping jaws (12) for grasping the workpiece (2), the clamping jaws (12) include a lower grip (13) and an opposing upper grip (14) the upper grip (14) being movable with respect to the lower grip (13) in a position, the clamping jaws (12) being movable in one of a plane of the workpiece (2) and a parallel plane to the horizontal workpiece support (4) crosswise to the bent edge (3) of the workpiece (2) or crosswise to the tool (6) and rotation of the workpiece (2) about a vertical axis (15), the manipulator (11) being located and supported above the horizontal workpiece support (4) and the clamping jaws (12) being movable parallel to the hold-down clamp (10) and rotatably supported about the axis (15) which extends at a right angle to the workpiece plane, the lower grip (13) is guided horizontally relative to the upper grip (14) by a moving guide and includes one of a C and a lying U shaped profile, wherein an inside of one of the C and the lying U forms at least one part of an enclosed open area (20) of the clamping jaws (12) and includes upper and lower generally horizontal legs, the lower leg, generally forms the lower grip, and the upper leg forms a guide piece (22) of the lower grip (13) and a rigid connection of the lower grip (13) to a sliding support.

9. Bending machine according to claim 1, wherein the lower grip (13) is rounded off or chamfered on a lower side against the movement directions.

10. Bending machine according to claim 1, wherein at least one of the lower grip (13) and the upper grip (14) of the clamping jaws (12) and a suspension for the clamping jaws (12) have at least one break-off position.

11. Bending machine according to claim 10, wherein a break-off position is thus arranged between an easily replaced part of the clamping jaws (12) and a remainder of the manipulator (11).

12. Bending machine according to claim 10, wherein the break-off position (24) is formed by a correspondingly weakened mounting bolt for attaching the lower grip (13) to one of a sliding guide (22) for the lower grip and a guide piece of the lower grip.

13. Bending machine according to claim 10, wherein the upper grip (14) is mounted on a mount with at least one bolt sized or formed to provide the break-off position.

14. Bending machine according to claim 1, wherein the suspension and support for the manipulator (11) is arranged above the workpiece plane (4) and is connected to a machine frame (26) of the Bending machine (1) directly and provided with a separate stand (27), located in an area of an assembly surface (26) and located at a defined position set off at a distance with respect to the machine frame.

15. Bending machine according to claim 14, wherein the machine frame (26) and the mount stand (27) for the manipulator (11) each have fixed standing locations independent of each other, on one of a common foundation and two foundations which are set off apart by a predetermined distance.

16. Bending machine according to claim 14, wherein a horizontal guide support (28) extending parallel to a processing side of a workpiece (2) is located on one of the processing machine (1), the machine frame (26) and the stand (27), and an additional guide girder (29) is arranged horizontally and at a right-angle to the guide support (28) and is connected via a carriage (30) to the guide support (28), the additional guide girder carries a horizontally movable adjustment carriage (31), on which a vertically movable mounting carriage (32) is arranged, the clamping jaws (12) being rotatably support on the vertically movable mounting carriage.

17. Bending machine according to claim 16, wherein path transmitters are arranged on one of the carriage and the sliding guides, and a rotational transmitter (34) is arranged on the rotational support of the clamping jaws (12), and the transmitters are connected with the controller of the bending machine (1).

18. Bending machine according to claim 16, wherein play free, direct electric linear drives (35) are provided for the adjustment of at least one horizontally adjustable carriage which supports the clamping jaws (12).

19. Bending machine according to claim 1, wherein the bending machine has a guide support (28) for the manipulator and at least one additional manipulator (11) with additional clamping jaws (12) are located on the same guide support (28).

* * * * *